United States Patent Office 3,065,465
Patented Nov. 20, 1962

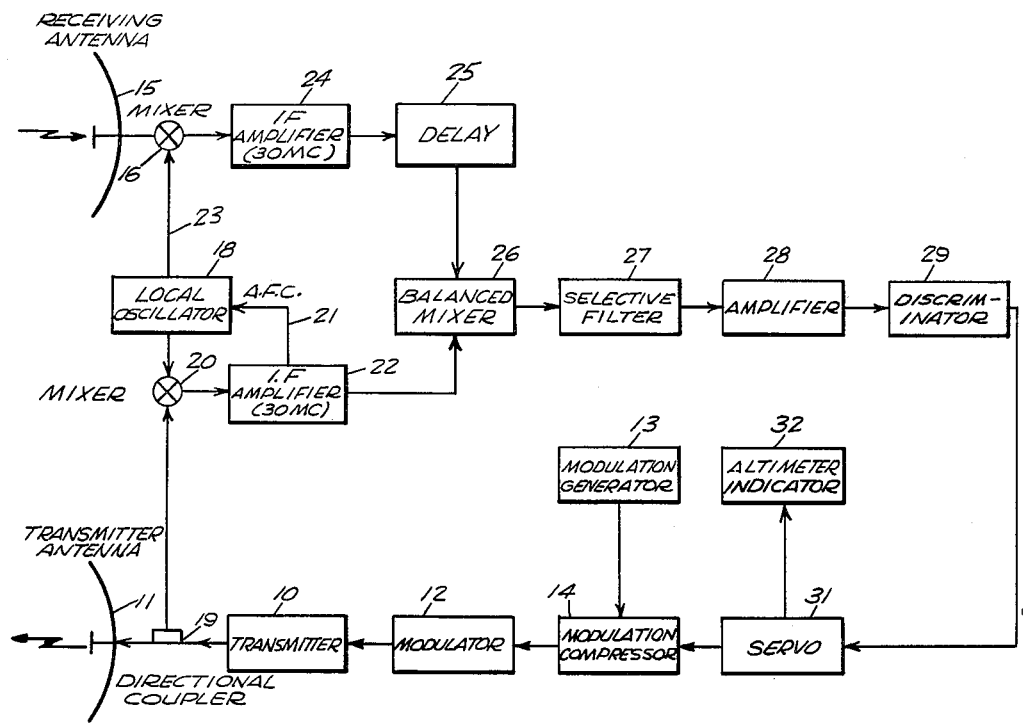

3,065,465
DISTANCE MEASURING DEVICES
Floyd T. Wimberly, Lexington, Mass., assignor to Raytheon Company, Lexington, Mass., a corporation of Delaware
Filed Apr. 25, 1958, Ser. No. 731,024
13 Claims. (Cl. 343—14)

This invention relates to distance measuring devices, and more particularly to an improvement upon airborne frequency modulated altimeters.

In many frequency modulated altimeter systems, a varying transmission frequency modulated signal is continuously compared with the received frequency modulated signal to obtain a low frequency difference signal proportional to the delay time over the transmission path. In such systems, relatively wide transmission beams are required to permit normal aircraft maneuvers without changing the altitude measurements due to the measurement of slant range. However, the return signals in wide beam systems generally contain Doppler interference signals due to components of the aircraft velocity off the axis of the beam. This is particularly true at low altitudes and at increased aircraft speeds where the undesired Doppler interference signals approach the altitude difference frequency. In this region, the accuracy of altitude measurement by the altimeter is directly and adversely affected. Indeed, the operator of an aircraft may be unable to determine whether the reading appearing on the indicating meter of the altimeter represents a true altitude or whether it is merely indicative of a spurious signal and represents a false altimeter reading. It is, therefore, desirable to provide that the altitude signal frequency is at all times substantially higher than the maximum frequency of the Doppler interference signals.

In accordance with a frequency modulated altimeter system of this invention, a predetermined delay is artificially introduced into the path of the reflected return signals prior to their comparison with the transmitted signals so that the zero altitude signal frequency is made to exceed the maximum Doppler signal frequency that may be encountered.

The invention further discloses the introduction of a predetermined delay in the reflected and received signal in the intermediate frequency path of the superheterodyne intermediate frequency receiving portion of an altimeter system prior to the correlation or comparison of said delay signal with a portion of the transmitted signal at the intermediate frequency in order to produce a control signal indicative of the altitude. The delay so introduced is calibrated out in the system indicator circuits. The control signal is then used to vary the frequency sweep width of the frequency modulated transmitter in the manner disclosed in Patent No. 2,729,814, of Floyd T. Wimberly, issued September 6, 1955.

The system of this invention constitutes an improvement over the system of the aforementioned patent in that it substantially eliminates Doppler interference and at the same time enhances the features of conventional frequency modulated altimeters.

In this embodiment, the delay may take the form of an artificial line composed of resistance, inductance, and capacitance elements or, a crystal delay line adapted to provide the desired delay may be employed. Accomplishing the delay in this manner eliminates heavy and bulky delay line components which would be required to provide attenuation of radio frequency energy in the path of the reflected signal and which would tend to reduce receiver sensitivity. By causing a delay in the received energy so that an induced altitude always exists within the confines of the altimeter equipment, the invention eliminates the damaging effects of Doppler interference in a simple and effective manner.

Other and further advantages of this invention will be apparent as the description thereof progresses, reference being had to the accompanying drawing wherein the single FIGURE is a schematic diagram of an altimeter system incorporating one embodiment of the invention.

The numeral 10 refers to a transmitter incorporating a magnetron or other source of microwave energy to be propagated by a transmitting antenna 11. The frequency of the energy generated by the transmitter 10 which may be, for example, at S-band, is periodically modulated by a frequency modulator 12. A sweep generator 13 which produces a wave of triangular form drives the frequency modulator 12 through a modulation compressor 14 which will be described in detail later.

The modulator 12 develops a 1000 cycle alternating current modulation signal in the form of a linear sawtooth of sufficient amplitude to sweep or modulate the magnetron or klystron oscillator at a sweep frequency of plus and minus 10 megacycles. The frequency modulated signal is radiated by antenna 11 toward a reflecting surface, which may be the terrain over which the aircraft is flying, and is reflected back from said surface to be received by receiving antenna 15 mounted adjacent to the transmitting antenna 11. The signal received by antenna 15 is fed into a balanced mixer 16 which is connected to a local oscillator 18 tuned to 30 megacycles from the transmitter frequency. A directional coupler 19 is adapted to feed a small portion of the output of the transmitter 10, the frequency of which is varied at plus and minus 10 megacycles, into a second mixer 20 which may be of the conventional single-ended crystal type. The sampling of energy fed to this crystal mixer is the transmitted frequency hereinafter designated by $f_0$, plus and minus the 10 megacycle sweep frequency hereinafter designated as B. In this invention, in order to maintain the difference frequency constant, the local oscillator 18 is adapted to track the two megacycle frequency sweep at a constant difference frequency of 30 megacycles by means of a conventional automatic frequency control loop 21 fed by a 30 megacycle IF amplifier 22 which amplifies the 30 megacycle output signal from the mixer 20. In this manner, the local oscillator 18 is at all times displaced 30 megacycles from the output frequency of the S-band transmitter 10.

The heterodyne beat frequency output, resulting from the mixing of the transmitted signals by way of conductor 23 with the reflected signals in mixer or detector 16, is fed into the input circuit of a multi-stage intermediate frequency amplifier 24. The difference frequency of 30 megacycles plus the altitude signal frequency, $f_h$, is amplified at 30 megacycles and fed to the novel delay circuit 25, which, according to the invention, artificially induces a predetermined altitude into the system. This predetermined delay can be achieved by a crystal delay line or it may consist of a typical $\pi$ or T network adapted to provide the required delay. In the present instance, the normal delay equivalent to 500 feet of altitude, where the interference signals begin to degrade altimeter performance, would correspond to a delay of approximately 1.5 microseconds. This may be computed when it is known that a radio frequency signal requires approximately 13 microseconds to travel a loop mile. By introducing the delay in the intermediate frequency amplifier path instead of in the radio frequency energy path from the antenna 15 to the mixer 16, the receiver sensitivity is not reduced by the unavoidable attenuation of radio frequency energy which occurs in an antenna delay line. In addition, it is not necessary to provide relatively heavy high-frequency components to introduce the delay.

The output of the 1.5 microsecond delay line 25 which is the delayed summation of the 30 megacycle IF frequency and the altitude signal frequency, $f_h$, is coupled directly to the input of a balanced detector or mixer 26. This mixer removes the 30 megacycle IF frequency and may be of the type shown in Patent No. 2,713,636 of Jenks et al., issued July 19, 1955. The output of the balanced mixer 26 is the beat frequency between the frequency of the transmitter 10 at the time the energy was transmitted, and the frequency of the same transmitter at the time the reflected energy is received plus the introduced delay. This beat frequency or control signal is fed to a 20 kilocycle selective filter having a bandwidth of approximately 6 kilocycles to improve the signal-to-noise ratio. The operating frequency of the selective filter may be calculated from the basic equation for the operation of a frequency modulated altimeter which is $$f_d = \frac{f_m B h}{246}$$

where $h$ is the altitude in feet plus the altitude represented by the delay, $f_m$ is the modulator sweep frequency in cycles per second, $f_d$ is the audio beat frequency between the instantaneous transmitted and received signals in cycles per second, and B is the peak-to-peak FM bandwidth or deviation of the transmitter frequency in megacycles. By selecting a repetition rate, $f_m$, of 1000 cycles, and a frequency excursion of 10 megacycles, and a delay altitude of 500 feet, it can be shown by the equation that the altitude frequency is at approximately 20 kilocycles at zero physical altitude so that a selective filter operating at that frequency is required. The output of selective filter 27 is amplified in amplifier 28 and fed to a discriminator 29 which is tuned to 20 kilocycles. The discriminator is a conventional type which converts the frequency modulated input signal to a direct current control signal. This control voltage is fed to a servo 31 to drive the modulation compressor 14 in order to change the amplitude of the modulating signal and, thereby, shift the peak-to-peak excursion of the transmitter frequency in response to a change in altitude. The modulation compressor 14 may comprise a potentiometer or voltage divider circuit adapted to adjust the amplitude of the modulator generator output which is fed into modulator 12.

In operation, therefore, a discriminator voltage output from discriminator 29, due to a change in altitude or distance to a reflective surface, is fed to the servo 31 to rotate the potentiometer, not shown, in the modulation compressor in order to produce a corresponding variation in the frequency deviation, B, of the transmitter. It should be understood that any modulation compressor, such as the one disclosed in my aforementioned patent, can be used to change the amplitude of the 1000 cycle modulator signal in modulator 12 and thereby change the peak-to-peak deviation, B, of the transmitter 10. As is known, frequency modulated altimeters usually compress either the transmitter peak-to-peak frequency deviation or the repetition rate with changes in altitude in order to maintain a constant beat frequency altitude signal. Certain advantages arise from keeping the difference frequency $f_d$ constant and varying B, the peak-to-peak transmitter frequency deviation. For example, by maintaining $f_d$ constant at a relatively low value and varying B, a relatively narrow band amplifier system suffices so that system noise is decreased and system sensitivity increased.

In addition, since the compression ratio developed in the modulation compressor 14 is equal to the ratio of the maximum altitude to the minimum altitude over which the altimeter is to operate and becomes infinite if the minimum altitude is zero, it is necessary to begin compression at a finite altitude and to maintain a constant modulator sweep frequency and peak-to-peak FM bandwidth at all lower altitudes. With the delay line 25 included in the system, an inherent altitude is always presented to the compression device 14. In this instance, the maximum compression ratio required would be the ratio of maximum altitude to the altitude represented by the delay. For example, by starting with a minimum altitude $h$ equal to 500 feet and a maximum altitude of 10,000 feet, the corresponding compression ratio would be approximately 20 to 1. This is accomplished, as noted, by means of a voltage divider circuit or potentiometer, not shown, in the modulation compressor which is driven by the servomotor 31. Since this voltage divider circuit is connected between the output of the modulation generator 13 and the transmitter, the position of the potentiometer is then dependent upon the position of the servomotor, which, as already stated, is a function of altitude. In this way, as altitude changes, the transmitter sweep width B is changed by the servo to hold the altitude signal frequency constant. The altimeter indicator 32 is connected to the servo 31 and is calibrated to compensate for the delay to indicate the correct altitude. In this manner, the introduced delay permits operation with a constant difference frequency over the entire altitude range, and thereby permits narrow-band operation with its improved signal-to-noise ratio and reduced susceptibility to jamming. The requirement of a frequency searching type narrow-band filter is also eliminated.

In addition, the delay arrangement of this invention permits operation of a coherency checking reliability arrangement over the complete altitude range. For example, coherency checking devices generally provide an output proportional to the altitude signal frequency and in previous frequency modulated altimeters, the checking function was discontinued below a certain minimum altitude since the altitude signal frequency decreased below the point where compression is possible. In this prior instance, an unbalance signal would appear equivalent to a zero altitude signal in the computing circuitry of the conventional altimeter, and the coherency checking device would be unable to distinguish between the two signals. By incorporating the delay into the present system, a constant altitude signal frequency is obtained from zero to the maximum altitude, and therefore, a coherency checking scheme suffers no disadvantage at any altitude.

This invention is not limited to the particular details of construction, materials and processes described, as many equivalents will suggest themselves to those skilled in the art. Accordingly, it is desired that this invention not be limited to the particular details of the embodiment disclosed herein except as defined by the appended claims.

What is claimed is:

1. In a frequency modulated distance measuring system, means for transmitting a frequency modulated wave to a reflecting surface, means for mixing the reflected wave from said surface with a frequency wave controlled from the transmitted wave to provide a first difference frequency wave, means for delaying the first difference frequency wave a predetermined duration, means for heterodyning the modulated wave to a difference frequency, means for comparing the delayed wave with the modulated wave at the difference frequency to produce a beat frequency signal, means to derive a control signal from said beat frequency signal, and means responsive to said control signal to indicate the distance between said reflecting surface and said transmitting means.

2. In a frequency modulated distance measuring system, means for transmitting a frequency modulated wave to a reflecting surface, means for mixing the reflected wave with a frequency wave controlled from the transmitted wave to provide a first difference frequency wave, means for delaying the first difference frequency wave a predetermined duration, means for heterodyning the modulated wave to a difference frequency, means for comparing the delayed first difference frequency wave with the modulated wave at the difference frequency to produce a control signal, and means responsive to said control signal to indicate the distance between said reflecting surface and said transmitting means.

3. In a frequency modulated distance measuring system, means for transmitting a frequency modulated wave to a reflecting surface, means for detecting the reflected wave, means for delaying the detected wave a predetermined duration, means for heterodyning the modulated wave to a difference frequency, means for comparing the delayed detected wave with the modulated wave at the difference frequency to produce a beat frequency signal, means to derive a control signal from said beat frequency signal, and means responsive to said control signal to change the frequency of said transmitting means in response to a change in distance of said reflecting surface.

4. A frequency modulated distance measuring device for measuring the distance between a body carrying said device and a reflecting surface comprising a transmitter adapted to transmit a wave toward said reflecting surface, means including a sweep generator for frequency modulating said transmitted wave, means responsive to said transmitted wave and the wave reflected from said surface for deriving a first difference frequency wave, means for delaying said difference frequency wave a predetermined interval to provide a delayed difference frequency wave, means for generating a second difference frequency, means for comparing said delayed difference frequency wave with said second difference frequency to provide a control signal, and means responsive to said control signal to change the frequency of said transmitter in response to a change in distance of said reflecting surface.

5. A frequency modulated distance measuring device for measuring the distance between a body carrying said device and a reflecting surface comprising a transmitter adapted to transmit a wave toward said reflecting surface, means including a sweep generator for frequency modulating said transmitted wave, means responsive to said transmitted wave and the wave reflected from said surface for deriving a first difference frequency wave, means for delaying said first difference frequency wave a predetermined interval to provide a delayed difference frequency wave, means for generating a second difference frequency, means for comparing said delayed difference frequency wave with said second difference frequency to provide a control signal, and means for actuating a distance indicator by said control signal.

6. In a distance measuring system, a transmitter, means for frequency modulating said transmitter at a predetermined rate to produce a frequency modulated wave having a predetermined sweep width, means for transmitting said frequency modulated wave to a wave reflecting surface, means for receiving and detecting the reflected wave, means for introducing a predetermined delay in the detected wave, means for heterodyning the modulated wave to a difference frequency, means for mixing the delayed wave with the modulated wave at the difference frequency to produce a beat frequency signal, means to derive a control signal from said beat frequency signal, means responsive to said control signal to vary the frequency sweep width of said frequency modulated transmitter to maintain said beat frequency constant, and means in response to said sweep width varying means to actuate an altitude indicator.

7. In a distance measuring system, a transmitter, means for frequency modulating said transmitter at a predetermined rate to produce a frequency modulated wave, means for transmitting said frequency modulated wave to a wave reflecting surface, means for detecting the reflected wave, means for introducing a predetermined delay in the detected wave, means for heterodyning the modulated wave to a difference frequency, means for mixing the delayed wave with the modulated wave at the difference frequency to produce a beat frequency signal, means to derive a control signal from said beat frequency signal, and means for shifting the peak-to-peak excursion of the transmitter frequency in response to a change in distance of said reflecting surface.

8. In a distance measuring system, a transmitter, means for frequency modulating said transmitter at a predetermined rate to produce a frequency modulated wave, means for transmitting said frequency modulated wave to a wave reflecting surface, means for receiving and detecting the reflected wave, means for deriving a first difference frequency from said detected wave, means for sampling a portion of the modulated wave transmitted directly from the transmitter to produce a second difference frequency wave, means for introducing a predetermined delay in the received wave at the first difference frequency, means for mixing the delayed wave at the first difference frequency with the second difference frequency to derive a control signal, and means responsive to said control signal to shift the peak-to-peak excursion of said frequency modulated transmitter to maintain said control signal constant.

9. In a distance measuring system, a transmitter means for frequency modulating said transmitter at a predetermined rate to produce a frequency modulated wave, means for transmitting said frequency modulated wave to a wave reflecting surface, means for detecting the reflected wave, means for introducing a predetermined delay in the detected wave, means for heterodyning the modulated wave to a difference frequency, means for mixing the delayed wave with the modulated wave at the difference frequency to produce a beat frequency signal, means to derive an alternating current control signal from said beat frequency signal, means for converting said control signal to a direct current signal, and means responsive to said direct current signal to change the amplitude of the frequency modulated signal in response to a change in distance of said reflecting surface.

10. In a distance measuring system, a transmitter, means for frequency modulating said transmitter at a predetermined rate to produce a frequency modulated wave, means for transmitting said frequency modulated wave to wave reflecting surface, means for detecting the reflected wave, means for deriving a first difference frequency from said detected wave, means for sampling a portion of the modulated wave transmitted directly from the transmitter to produce a second difference frequency wave, means for introducing a predetermined delay in the detected wave at the first difference frequency, means for mixing the delayed wave at the first difference frequency with the second difference frequency to derive a control signal, means for converting said control signal to a direct current signal, servo means responsive to said direct current signal to change the peak-to-peak excursion of said frequency modulated transmitter frequency in response to a change in distance of said reflecting surface.

11. In a distance measuring system, a transmitter, means for frequency modulating said transmitter at a predetermined rate to produce a frequency modulated wave, means for transmitting said frequency modulated wave to a wave reflecting surface, means for detecting the reflected wave, means for deriving a first difference frequency from said detected wave, means for sampling a portion of the modulated wave transmitted directly from the transmitter to produce a second difference frequency wave, means for introducing a predetermined delay in the detected wave at the first difference frequency, means for mixing the delayed wave at the first difference frequency with the second difference frequency to derive a control signal, means including a servomotor for varying the sweep width of said transmitter in a direction adapted to maintain said altitude difference signal constant during a change in distance of said reflecting surface.

12. A frequency modulated distance measuring system for measuring the distance between a body carrying said device and a reflecting surface comprising a transmitter adapted to transmit a wave towards said reflecting surface, means including a sweep generator for frequency modulating said transmitted wave, means for detecting said reflected wave, means for introducing a predetermined delay in the detected wave, means for heterodyning the modulated wave to a difference frequency, means for mixing the delayed wave with the modulated wave at the difference frequency to produce a difference frequency wave, means energized by said difference frequency wave for producing a direct current voltage proportional to the frequency of said difference frequency wave modulation compressor means connected to said sweep generator and to said transmitter for varying the sweep voltage applied to said transmitter in a direction adapted to maintain said difference frequency wave constant during a change in distance to said reflecting surface.

13. A frequency modulated distance measuring system for measuring the distance between a body carrying said device and a reflecting surface comprising a transmitter adapted to transmit a wave towards said reflecting surface, means including a sweep generator for frequency modulating said transmitted wave, means for detecting said reflected wave, means for introducing a predetermined delay in the detected wave, means for heterodyning the modulated wave to a difference frequency, means for mixing the delayed wave with the modulated wave at the difference frequency to produce a difference frequency wave, servo means energized by said difference frequency wave for producing a direct current voltage proportional to the frequency of said difference frequency wave, modulation compressor means connected to said sweep generator and to said transmitter and fed by said servo means to vary the sweep voltage applied to said transmitter in a manner adapted to maintain said difference frequency wave constant during a change in distance of said reflecting surface, and indicator means actuated by said servo to indicate the distance to said reflecting surface.

References Cited in the file of this patent

UNITED STATES PATENTS

| | | |
|---|---|---|
| 2,537,593 | Landon et al. | Jan. 9, 1951 |
| 2,543,782 | Kiebert | Mar. 6, 1951 |
| 2,544,293 | Branden | Mar. 6, 1951 |
| 2,686,302 | Capelli | Aug. 10, 1954 |
| 2,928,085 | Katz | Mar. 8, 1960 |

OTHER REFERENCES

"Electronics and Radio Engineering," by Frederick E. Terman, 4th Edition, published by McGraw-Hill Co., 1955, pp. 1035, 1036.